United States Patent
Gajjela et al.

(10) Patent No.: US 11,466,220 B2
(45) Date of Patent: Oct. 11, 2022

(54) LOW ENERGY PROCESS TO PRODUCE A HYDROPHOBIC OIL FROM BIOMASS PYROLYSIS LIQUIDS

(71) Applicant: ALDER ENERGY, LLC, Charleston, SC (US)

(72) Inventors: Sanjeev Gajjela, Didcot (GB); Ralph Phillips Overend, Ottowa (CA); Javier Gonzalez Catalan, Saragossa (ES); Zhiheng Wu, Beeston (GB); Patricia Lapuente, Santander (ES); Jose Antonio Medrano Catalan, Didcot (GB)

(73) Assignee: ALDER ENERGY, LLC, Washington, DC (US)

( * ) Notice: Subject to any disclaimer, the term of this patent is extended or adjusted under 35 U.S.C. 154(b) by 661 days.

(21) Appl. No.: 16/319,469

(22) PCT Filed: Jun. 21, 2017

(86) PCT No.: PCT/GB2017/052147
§ 371 (c)(1),
(2) Date: Jan. 21, 2019

(87) PCT Pub. No.: WO2018/015768
PCT Pub. Date: Jan. 25, 2018

(65) Prior Publication Data
US 2019/0330540 A1 Oct. 31, 2019

(30) Foreign Application Priority Data
Jul. 22, 2016 (GB) ...................................... 1612716

(51) Int. Cl.
*C10G 21/00* (2006.01)
*C10G 21/02* (2006.01)
*C10G 21/16* (2006.01)
*C10G 21/28* (2006.01)

(52) U.S. Cl.
CPC ............. *C10G 21/02* (2013.01); *C10G 21/16* (2013.01); *C10G 21/28* (2013.01); *C10G 2300/1011* (2013.01); *C10G 2300/4006* (2013.01); *C10G 2400/30* (2013.01)

(58) Field of Classification Search
CPC ........ C10G 21/02; C10G 21/16; C10G 21/28; C10G 2400/30; C10G 2300/1011; C10G 2300/4006
See application file for complete search history.

(56) References Cited

U.S. PATENT DOCUMENTS

| | | |
|---|---|---|
| 4,942,269 A | 7/1990 | Chum et al. |
| 6,193,837 B1 | 2/2001 | Agblevor et al. |
| 8,022,260 B2 | 9/2011 | O Connor et al. |
| 8,192,627 B2 | 6/2012 | Gallop et al. |
| 8,323,456 B2 | 12/2012 | Lin et al. |
| 8,822,745 B2 | 9/2014 | Fjare et al. |
| 8,961,794 B2 | 2/2015 | Fjare et al. |
| 9,212,313 B2 | 12/2015 | Pollard et al. |
| 9,222,044 B2 | 12/2015 | Traynor et al. |
| 9,303,213 B2 | 4/2016 | Lin et al. |
| 9,387,415 B2 | 7/2016 | Sanchez et al. |
| 10,351,783 B2 | 7/2019 | Tanzio et al. |
| 10,457,873 B2 | 10/2019 | Stamires et al. |
| 10,457,882 B2 | 10/2019 | Brown et al. |
| 10,633,605 B2 | 4/2020 | Asikkala et al. |
| 10,920,150 B2 | 2/2021 | Chiaberge et al. |
| 2009/0054711 A1* | 2/2009 | Lawrence ................ C10G 3/40 585/240 |
| 2013/0291431 A1 | 11/2013 | Steele et al. |
| 2013/0306557 A1 | 11/2013 | Moore et al. |
| 2014/0020281 A1 | 1/2014 | Lin et al. |
| 2014/0259888 A1 | 9/2014 | Wang et al. |
| 2014/0330057 A1* | 11/2014 | Dijs ....................... C10G 1/045 585/240 |
| 2015/0183961 A1 | 7/2015 | Talwar |
| 2015/0184025 A1 | 7/2015 | Talwar |
| 2015/0184098 A1 | 7/2015 | Talwar |
| 2016/0317947 A1 | 11/2016 | Sanchez et al. |
| 2021/0309924 A1 | 10/2021 | Gajjela et al. |

FOREIGN PATENT DOCUMENTS

CN 101531922 A 9/2009

OTHER PUBLICATIONS

Park, Separation of Switchgrass Bio-Oil by Water/Organic Solvent Addition and pH Adjustment, Energy & Fuels . (Year: 2016).*
B Scholze, D Meier, Characterization of the water-insoluble fraction from pyrolysis oil (pyrolytic lignin). Part I. PY-GC/MS, FTIR, and functional groups, Journal of Analytical and Applied Pyrolysis, vol. 60, Issue 1,2001, pp. 41-54, ISSN 0165-2370, https://doi.org/10.1016/S0165-2370(00)00110-8.
European Search Report fro EP 17749210.5.
Malaysian Search Report dated Dec. 21, 2021.
De Haan et al., "Paper: A techno-economic evaluation on the feasibility of chemicals from pyrolysis oil," Paper, Presented at Proceedings of the 3rd Nordic Wood Biorefinery Conference (NWBC 2011), Stockholm, Sweden, Mar. 22-24, 2011, 8 pages.

(Continued)

*Primary Examiner* — Prem C Singh
*Assistant Examiner* — Brandi M Doyle
(74) *Attorney, Agent, or Firm* — Fish & Richardson P.C.

(57) ABSTRACT

Described is a novel process for fractionating biomass pyrolysis oil quantitatively into energy dense hydrophobic aromatic fraction and water-soluble organics in an economical and energy efficient manner. Using the concepts of solvents and anti-solvent behaviours to separate the pyrolysis oil, which is an emulsion, a method utilising minimal quantities of solvents and water is proposed, By comparison with the existing methods to isolate the hydrophobic aromatic fraction, there is a volume reduction of greater than 50:1. Additionally, there is a significant time saving over the 24 hours for the accepted method as a solvent, and the anti-solvent system is spontaneous.

19 Claims, 4 Drawing Sheets

(56) References Cited

OTHER PUBLICATIONS

Bennett et al., "Extraction and hydrolysis of levoglucosan from pyrolysis oil," Bioresource Technology, 2009, 100:6059-6063.

Hansen, "The Three Dimensional Solubility Parameter and Solvent Diffusion Coefficient," Dissertation for the degree of Technical Doctorate of Engineering, Polytechnic School of Engineering at the Technical University of Denmark, Aug. 1967, 103 pages.

International Preliminary Report on Patentability in International Appln. No. PCT/GB2016/051735, dated Dec. 26, 2017, 8 pages.

International Preliminary Report on Patentability in International Appln. No. PCT/GB2017/052147, dated Nov. 16, 2018, 14 pages.

International Search Report and Written Opinion in International Appln. No. PCT/GB2016/051735, dated Dec. 29, 2016, 11 pages.

International Search Report and Written Opinion in International Appln. No. PCT/GB2017/052147, dated Oct. 30, 2017, 13 pages.

Lehto et al., "Fuel oil quality and combustion of fast pyrolysis bio-oils," VTT Technology 87, 2013, 84 pages.

Li et al., "Effects of acid and metal salt additives on product characteristics of biomass microwave pyrolysis," Journal of Renewable and Sustainable Energy, 2016, 8:063103, 13 pages.

Lindfors et al., "Fractionation of Bio-Oil," Energy Fuels, Aug. 2014, 28(9):5785-5791.

Ma'ruf et al., "Paper: Lignin isolation process from rice husk by alkaline hydrogen peroxide: Lignin and silica extracted," Paper, Presented at Proceedings of the AIP Conference Proceedings: International Conference on Chemistry, Chemical Processes, and Engineering (IC3PE) 2017, Yogyakarta, Indonesia, Nov. 15-16, 2016, 1823:020013-020013-5

Oasmaa et al., "Paper: Fast Pyrolysis of Biomass into Fuels and Chemicals," Paper, Presented at Proceedings of the The 6th Nordic Wood Biorefinery Conference, Helsinki, Finland, Oct. 20-22, 2015, 220-224.

Onarheim et al., "Process Simulation Development of Fast Pyrolysis of Wood Using Aspen Plus," Energy Fuels, Dec. 2014, 29(1):205-217.

Search Report in Great Britain Appln. No. GB1511106.5, dated Apr. 28, 2017, 2 pages.

Song et al., "Effective phase separation of biomass pyrolysis oils by adding aqueous salt solutions," Energy Fuels, Jun. 2009, 23(6):3307-3312.

Xu et al., "Bio-Oil Upgrading by Means of Ozone Oxidation and Esterification to Remove Water and to Improve Fuel Characteristics," Energy Fuels, Mar. 2011, 25(4):1798-1801.

Xu et al., "Rice husk bio-oil upgrading by means of phase separation and the production of esters from the water phase, and novolac resins from the insoluble phase," Biomass and Bioenergy, Jul. 2010, 34(7): 1059-1063.

Zilnik and Jazbinsek, "Recovery of renewable pheonolic fraction from pyrolysis oil," Separation and Purification Technology, Feb. 2012, 86:157-170.

\* cited by examiner

LOW ENERGY PROCESS TO PRODUCE A HYDROPHOBIC OIL FROM BIOMASS PYROLYSIS LIQUIDS

FIELD OF THE INVENTION

The present invention relates to a novel process for fractionating biomass pyrolysis oil quantitatively into energy dense hydrophobic aromatic fraction and water-soluble organics in an economical and energy efficient manner. Subsequent utilisation of these phases to is as raw material precursors for the production of fuel range hydrocarbons, fuel oils, fuel additives, fuel blends, concentrated fermentable sugars, industrial solvents, and chemicals.

BACKGROUND OF INVENTION

In recent years, thermochemical utilisation of biomass in the energy sector has attracted renewed interest worldwide. The reason being, while the output of the other renewable energy sources is primarily electricity, biomass is able to produce liquid, gaseous, or solids of variable energy contents that can be used for energy or chemicals production. Pyrolysis oil (PO) is a free-flowing liquid product produced from biomass fast pyrolysis. In the fast pyrolysis process, biomass is rapidly heated to 450-550° C. in the absence of oxygen, with short residence time and quickly quenched to produce a condensate, which is known as PO, bio-oil or bio-crude. Depending on the process conditions and the condensation train, PO can be either a single-phase or a two-phase mixture comprising a heavy viscous fraction and an aqueous low viscosity fraction with light organic molecules. PO has been recognised as a renewable feedstock for the production of transportation fuels and various other green applications.

PO as a fuel has many environmental advantages when compared to fossil fuels. Upon combustion, PO produces half of the $NO_x$, negligible quantities of $SO_x$ emissions when compared with fossil fuels, and is $CO_2$ neutral. However, the large-scale production of liquid fuels from PO has so far been limited because of its high acidity and thermal instability. Furthermore, PO has high water content (25-30%), high oxygen content (40-50%), is immiscible with fossil fuels, and undergoes phase separation and an increase in viscosity during prolonged storage (ageing).

PO is a complex mixture containing various kinds of oxygen-containing organics (e.g. acids, aldehydes, alcohols, phenols, phenolic derivatives, sugars, and others with multiple functional groups). These oxygen-containing organic compounds make PO unstable, corrosive, and incompatible with conventional fuel and directly affect its commercial applications. Therefore, it is necessary to upgrade the raw PO before it can be used as a viable renewable fuel. Currently, there are no commercial technologies that will produce fungible renewable fuels from PO. Novel technologies need to be developed that can generate sufficient renewable fuel volumes to replace or to blend with the current petroleum sources. Therefore, new methods and processes for upgrading PO are required.

Some PO upgrading technologies have been proposed to improve the product properties and to increase the range of possible applications. Major upgrading technologies include hydrodeoxygenation (HDO) and hydrocracking. Hydrogen consumption is very high for both these technologies, which in turn affects the scale up and economics of the processes. It has become customary to practice the hydroprocessing of PO by utilising a 2-stage approach in which the $1^{st}$ stage comprises a hydrotreating stage utilising a mild temperature (<300° C.) for the reaction. This $1^{st}$ stage reduces the polymerization of PO that occurs when raw PO is subjected to temperatures >100° C. Hydrocracking the lightly hydrotreated product is then practised in a $2^{nd}$ stage reaction at a higher temperature (>350° C.). The 2 stage hydroprocessing method usually requires two reactors which increase the capital cost of the hydroprocessing technology; more reaction time is also required increasing variable costs. Even without the considerations of high hydrogen consumption, these technologies face major challenges regarding corrosion, catalyst fouling, catalyst stability and product selectivity.

Alternatively, some studies have been reported dealing with the chemical upgrading of PO by esterification reaction with alcohol at mild conditions using mineral acid catalysts e.g. sulphuric acid, or various heterogeneous catalysts including resin acid catalysts. From a chemical point of view, it is anticipated that the organic acids and aldehydes are converted by the reactions with alcohols to esters and acetals, respectively. The product from the process mentioned above with different catalysts still contains a high amount of water, has low calorific value and large amounts of alcohol. The undesirable properties of PO are correlated with particular types of compounds. Acids contribute to the corrosiveness of PO, and the instability of PO is mainly caused by the aldehydes, furans, ketones and phenols. Hence these should be suppressed in the final product. Also, pyrolytic sugars are present ~14-33% mass ratio in many POs depending on the feedstock, and process conditions.

Oxygenates with furanic rings are most likely to form coke with aldehydes because of their thermal reactivity. These precursors react on the catalytic surfaces and fill up the pores, which contributes to inactivation of catalysts during the upgrading and hydrodeoxygenation process of PO. Small aldehyde molecules are easily condensed together with aromatics to form polymers. Although increasing the hydrogen pressure and reaction temperature while reducing the acidity of the catalyst can drive down coking on the catalyst surface, it is a significant challenge to minimise the hydrogen consumption and coking at mild conditions.

Effective separation of pyrolytic sugars and phenolic oligomers offers an array of industrial opportunities and also improves the quality of the PO for further processing. Pyrolytic-sugars can be useful for direct upgrading to liquid transportation fuels and/or fermentation to corresponding alcohols. Successful pyrolytic-sugars separation/removal also has the potential for pharmaceutical applications. Phenolic oligomers have the ability to be used in various applications that include resins, binders, asphalt, coatings, adhesives, aromatic chemicals, unique polymers, production of fuels and preservatives.

Currently, most of the PO phase separation processes involve either adding a large excess of water (Lindfors et al. 2014) (Bennett, Helle, and Duff 2009) (Vitasari, Meindersma, and de Haan 2011), typically a 10:1 mass ratio to the PO or adding various quantities of aqueous salt solutions to the PO (Song et al. 2009) (Fele ilnik and Jazbinšek 2012). Also, by using salt solution the resultant product is contaminated with inorganic salts and a further washing step is required to remove the inorganic salts. Very high water requirement and the resultant wastewater treatment are other major disadvantages. Solvent/anti-solvent phenomena have also been utilised using water and immiscible solvents such as dichloromethane (Li, Xia, and Ma 2016). However, they have used very high quantities of anti-solvent i.e. almost equal to the amount of pyrolysis oil.

Also, considering the hazardous nature of the antisolvent (dichloromethane) and the amounts used are not economical for industrial scale-up. All these procedures require a minimum of 10 to 24 hh for the phase separation, and the resultant phase separated product is heavier and difficult to separate.

SUMMARY OF THE INVENTION

According to the invention, there is provided a process for quantitatively fractionating pyrolysis oil (PO) to produce two fractions, A) a hydrophobic aromatic fraction (HAF) and B) a concentrated aqueous solution of water soluble organics; said process using solvent/anti-solvent concepts and comprising the steps of;

a) the addition of an appropriate quantity of anti-solvent to the single phase PO, b) followed by addition of a specific volume of a solvent with mixing, c) settling the mixture to allow phase separation into two fractions, thereby obtaining d) an organic phase comprising the solvent, the HAF and, e) an aqueous phase comprising primarily the carbohydrate derived from the PO, along with acids, and low molecular weight phenolics.

Preferably, in step a), the anti-solvent is water or a mixture of water with low molecular weight alcohols to facilitate recovery of materials. Further preferably, the amount of anti-solvent depending on the water content of the PO is in the range of 1-20% mass ratio concerning PO. Yet further preferably, the range is from 5 to 10% concerning pyrolysis oil.

Optionally, in step b) the solvent has a low solubility in water and preferably a density of less than 1000 kg/m3 to obtain a density difference with the final water phase wherein the solvent phase/HAF is the top phase and the water soluble are the bottom phases. Further optionally, the solvent has less than 10% mass fraction solubility in water and has a moderate polarity such that the solvent has an affinity for the HAF. Still further optionally, the solvent forms an azeotrope with water when distilled. This allows different phases to be separated more easily.

Preferably, the solvent is selected from $C_4$-$C_8$ monohydric alcohols, $C_2$-$C_8$ alcohol esters and diethyl ether or mixture thereof. Further preferably, the solvent is butyl acetate or a derivative of butyl acetate.

The solvent is preferably present at from 1-20% mass ratio of the PO, and further preferably at from 5-10% mass ratio of the PO.

Preferably, the fractionation is carried out at a temperature in the range of from 15° C. to 75° C. Further preferably, the fractionation is carried out at a temperature in the range of from 15° C. to 25° C. to reduce energy consumption.

Conveniently, in the hydrophobic aromatic fraction there is a volume reduction of greater than 50:1, allowing processing to be carried out more easily and reducing equipment costs.

Preferably, the fractionation is carried out in a continuous, or batch reactor systems.

Preferably, the fractionation time under normal gravity ranges from 15 minutes to 2 hours.

Optionally, fractionation is carried out using centrifugal separation at a force in the range of from 8000 g-12000 g to accelerate and improve separation.

DETAILED DESCRIPTION OF THE INVENTION

The present invention relates to a process for converting PO obtained by pyrolysis of biomass into high-quality fuel/boiler fuel/marine fuel, chemicals and fuel blends, pyrolytic sugars, phenolic oligomers and alkyl esters. In certain embodiments, a process is disclosed for fractionating or phase separating the PO and subsequently these fractions will be used to produce specific high-value products, the process comprising steps in which, a) the organic phase of the phase separated product is further distilled to recover the solvent as well as hydrophobic aromatic polymer (HAF) as the primary product, and b) the aqueous phase of the phase separated product after a phase separation process is further processed by liquid-liquid extraction with solvents to extract and recover pyrolytic sugars and low molecular weight phenolics.

PO is a single-phase material as defined in ASTM D7544-12 Standard Specification for Pyrolysis Liquid Biofuel—Grades G and Grade D. This single-phase material has a low viscosity on the account of ~25% mass fraction of water embodied in what is recognised to be an emulsion. The remainder of the material consists of water soluble small molecules—including acetic acid (HAc) as the most prominent; sugar and sugar polymers derived from the cellulose, and a hydrophobic aromatic polymer (HAF) derived from both the lignin and the cellulose breakdown. Often the HAF is described as "pyrolytic lignin", which is a term of art that describes the substance that precipitates out of cold water when PO is slowly added.

There is an analytical procedure to quantify the "pyrolytic lignin" wherein the PO is first mixed with an equal mass of water to obtain a raw precipitate. This precipitate typically has about 50% of the initial mass. However, this is still contaminated with other materials from the PO and has to be re-dissolved in an equal mass of methanol. To this mixture, another equal mass e.g. 1 kg of water is added to precipitate a purified pyrolytic lignin from which the methanol has to be evaporated.

Alternative means of obtaining pyrolytic lignin make extensive use of organic solvents. Again, the mass ratios of PO to solvent are at least 1:1, and on separation, the solvent has to be water washed typically again with an equal or greater mass, followed by an acid-base process to extract the HAF comprised of phenols and neutrals. Both of these behaviours are very characteristic of emulsions and breaking them into separate phases.

There is direct evidence for the emulsion nature of PO that has come from small angle neutron scattering (SANS). The main phase consists of aggregates of lignin-derived molecules—while the dispersed phase is not visible in SANS and is presumed to be the water and water soluble molecules. With ageing, the aggregates tend to grow, and they are typically the equivalent volume of 4-coniferyl alcohol C-9 lignin units (typically called G-Lignin as they have the guiacyl OH and methoxy substituents in the ring). The molecular weight of 4G-lignins i.e. tetramer lignin is approximately 700-750 g/mol.

As PO ages, there are chemical reactions taking place that result in the production of water, some cross-linking of small molecules, and according to the SANS results in agglomeration of the tetramer units into larger units. This is not polymerization per se, the forces holding the tetramers together are van der Waals/Electrostatic, but the net result is that these aggregates fall out of solution.

The VTT group has recently published further insight into the emulsion nature of single phase PO (Lehto et al. 2013). The picture that has emerged is that the water insoluble (WIS) material—aka pyrolytic lignin—is held together using co-solvent molecules, in a loose network which solubilizes the water, and water solubles. The co-solvent molecules are C1-C6 type small organic molecules with a polar group e.g. —OH (alcohol and phenol), >C=O, —COOH, and a non-polar hydrocarbon or aromatic "body". The water soluble (WS) phase holds most of the water, and the organic molecules that are highly polar e.g. sugars including anhydrosugars such as levoglucosan, and polyols e.g. sugar monomers and oligomers.

This emulsion can be destabilised by increasing the water to organic ratio so that the WIS (tetramer lignin) separates, and then adding a co-solvent back to the freshly phase separated material such that a single uniform phase is formed.

Figure 1:
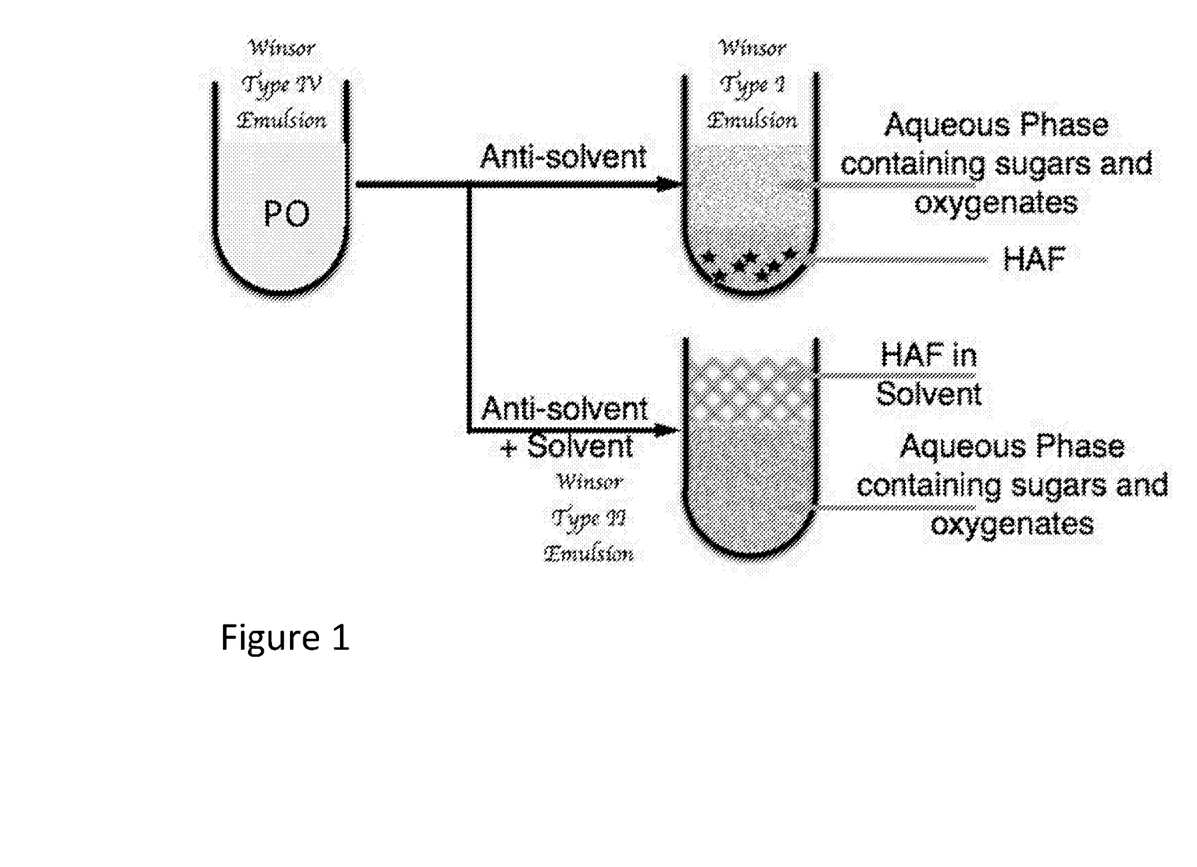
FIG. 1. Anti-solvent/solvent behaviour with pyrolysis oil (Winsor type emulsion).

This is anti-solvent behaviour and the single-phase PO exists as a Type IV Winsor emulsion as shown in FIG. 1. In this case, the HAF (pyrolytic lignin) is behaving as a surfactant as well as an oil normally immiscible in water, while the polar organics are in an aqueous solution. On increasing the water concentration the WIS (water insoluble HAF) forms a bottom phase on account of its density, and an upper phase of mainly water and water soluble polar materials—a Winsor Type II emulsion is created, and as shown in (Oasmaa et al. 2015), adding small quantities of amphiphile molecules can reverse this and convert the Winsor Type II emulsion back to the apparent single phase Winsor Type IV emulsion.

There is, however, another Winsor emulsion—a type I which can be created by adding a lipophilic polar solvent— one which has Hansen solubility parameters in the range (Dispersion 8-10 MPa^0.5, Polar 2-3 MPa^0.5, and Hydrogen Bonding in the range of 2-4.5 MPa^0.5). For a list of typical values for organic molecules see (Hansen 2007). Only a small amount of the lipophilic polar solvent is needed if the Winsor type IV emulsion is close to the critical point of converting to a Winsor type I emulsion. Then only a small amount of additional water as anti-solvent will trigger the formation of the Type I emulsion with an aqueous phase containing the majority of the sugar and water-soluble organics, and a solvent phase containing the HAF—pyrolytic lignin.

For recovery of the HAF, the very concentrated solution in the lipophilic polar solvent can be extracted from a minuscule volume of distilled water, and after drying the solvent phase, the residual heavy oil can be recovered by evaporation of the solvent. The combined water phase can be extracted with organic solvents and subsequently distilled to produce clean fractions of pyrolytic sugars and phenolic monomers. Further, these phenolic monomers can be added back to the HAF fraction for the future upgrading purposes.

Figure 2:
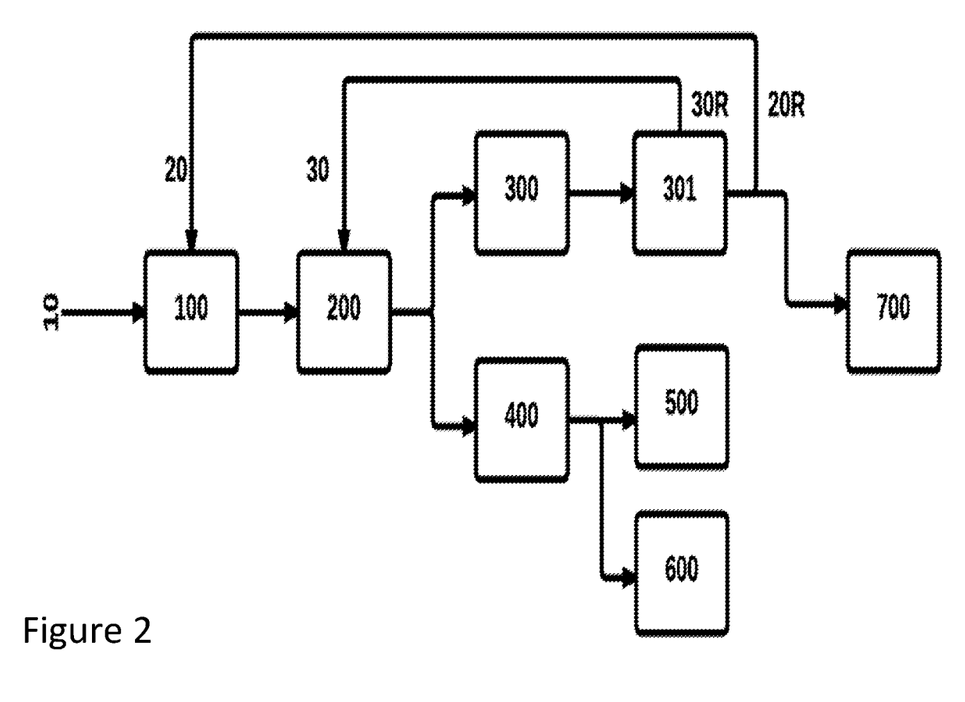
FIG. 2. Process of flow diagram to produce HAF.
Figure 3:
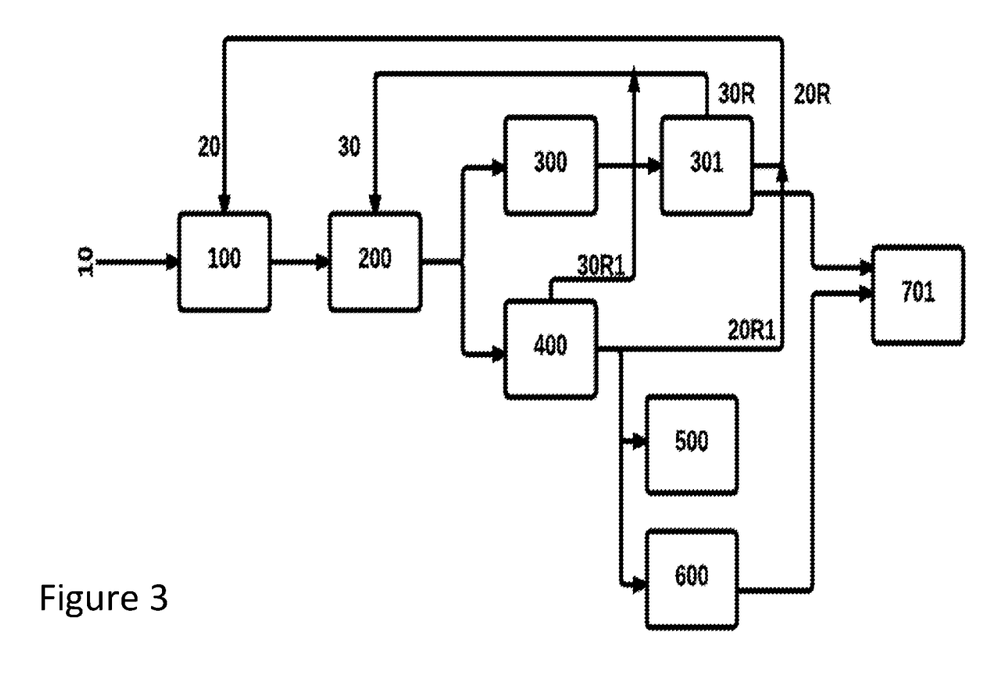
FIG. 3. Process of flow diagram to produce HAF with low molecular weight phenolics.

Using the Winsor emulsion behaviour, the additional volumes of solvent and water are minimised. Process flow diagram of the process is shown in FIGS. 2 and 3. In FIG. 2, to the PO (10), solvent (20) is added at first and stirred vigorously for ~30 minutes at room temperature in a batch or continuous reactor (100). Wherein the amount of solvent, depending on the water content of the PO is in the range of 1-20% mass ratio concerning PO. Wherein the preferable is range is from 5 to 10% concerning the PO.

To this mixture, solvent (30) is added and stirred vigorously for ~60 minutes at room temperature in a batch or continuous reactor (200). The solvents are selected from $C_4$-$C_8$ monohydric alcohols, $C_2$-$C_8$ alcohol esters and diethyl ether. The preferable solvents are butyl acetate and any derivatives of butyl acetate. The amount of solvent added is, dependent on the water content of the PO, and is in the range of 1-20% mass ratio concerning PO. Wherein the preferable is range is from 5 to 10% concerning the PO.

After settling the mixture for about 10 to 90 minutes, a clear, distinct phase separation is achieved i.e. a top organic phase (300) and a bottom aqueous phase (400). Further distillation (301) of the top organic phase (300) results in HAF (700) and also anti-solvent (20R) and solvent (30R) which are recycled. The bottom aqueous phase (400) is further solvent extracted followed by distillation to produced pyrolytic sugars (500) and phenolic monomers (600).

The process shown in FIG. 3 follows the same procedure as FIG. 2 but also, the phenolic monomers (600) produced from the bottom aqueous phase (400) are added to the final HAF product (701). This addition, in turn, increases the yields of the HAF of up to 10%. Also, recycled solvent (30R1) and anti-solvent (20R1) from bottom aqueous phase are added back to the recycling lane.

In a typical example starting with 100% of PO the addition of butyl acetate (~10%), and ~2% of water anti-solvent concerning PO, will produce an instant phase separation into the fractions of a top organic phase (42%) and bottom aqueous phase (58%). Assuming all the 100% butyl acetate or solvent is recycled, the overall yields from the process comprising of 36% of HAF, 30% of pyrolytic sugars, 11% phenolic monomers and the rest is residual water (~23%). In most cases, these yields vary between the type of feedstocks and processing conditions used to produce the corresponding PO. In another scenario, the 11% phenolic monomers are added back to the HAF fraction, and this will increase the overall yield of HAF to 47%. The fractionation step is typically carried out at a temperature of from 0° C.-75° C. However, a range of from 15-75° C. is preferred and especially from 15-25° C. Although temperatures in the range of 0-15° C. produce faster fractionation, the shortened time period is offset in cost and energy terms by the increased cost in cooling the system.

Figure 4:
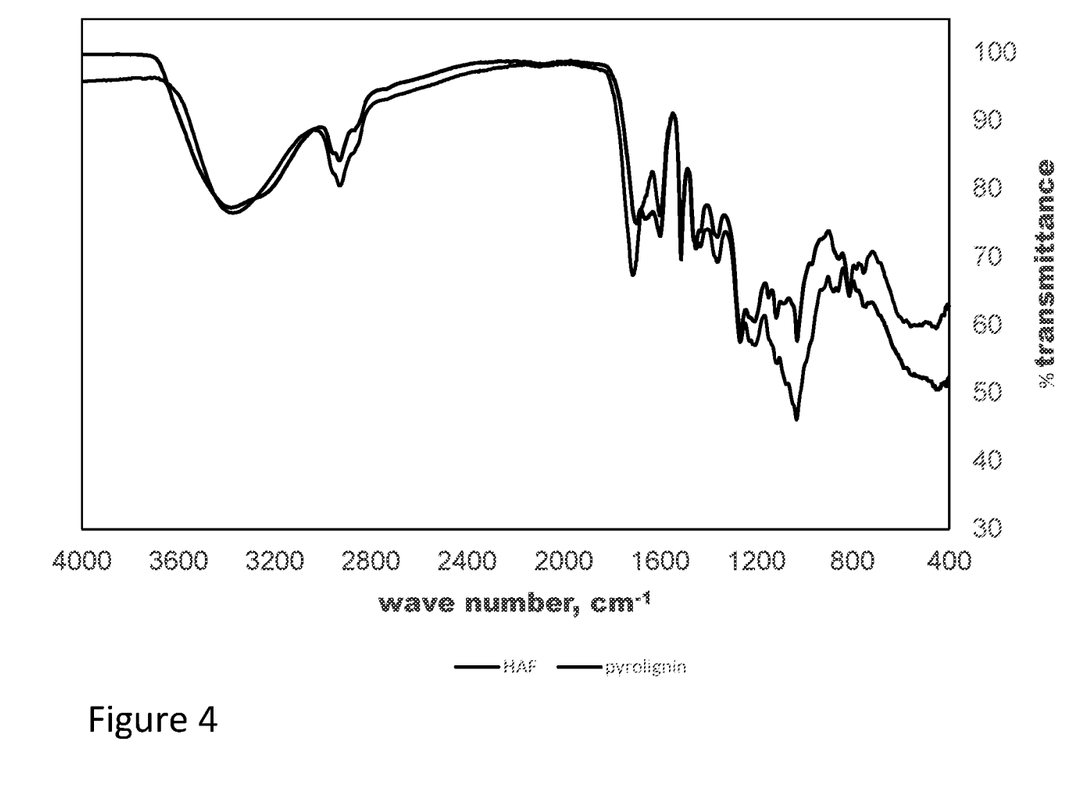
FIG. 4 FTIR spectral comparison of HAF and pyrolignin.

The HAF produced from the above steps, and then evaporation of the solvent produces a viscous black liquid with the same properties as the pyrolytic lignin isolated using water washing methods. This is also confirmed by the FTIR spectral comparing of the HAF and pyrolignin as shown in FIG. 4.

Eligible solvents are required to have Hansen parameters in the above range, and simultaneously must have low solubility in water, and depending on the downstream process requirements, there will be a need for appropriate stability, environment, health and safety characteristics to enable its recovery.

ANALYTICAL METHODS

Viscosity

Viscometric measurements were performed at 40° C. with a Brookfield DV-II+ Pro viscometer with small sample adapter and spindle SC4-18.

Heating Value Measurements

To determine the higher heating value (HHV) of the biofuels and different phases, approximately 1 g of samples were burned in an IKA C5003 type bomb calorimeter under 3 MPa oxygen pressure and in the dynamic method of operation. Standardisation and thermochemical corrections followed the ASTM D 240 test method. Samples with high water content were combusted with paraffin strips as spiking material (45.78 MJ/kg).

TAN and Water Analyses

The total acid number (TAN) and water content of the fuel samples were determined by Aqumax TAN and Aquamax KF Volumetric titrators (GRScientific) according to ASTM D 664 and ASTM E 203 standards.

CHN

The elemental composition analysis of the samples (C, H and N) was carried out at 900° C. by a Flash 2000 analyser, and the oxygen content (O) was calculated by difference.

GC-MS Analysis

Sugar compounds were analysed by gas chromatography-mass spectrometry (Agilent 7890A GC-MS) after a standard trimethylsilylation with HMDS. The injection unit temperature of the GC was 300° C., and it was coupled to an HP-VOC column (60 m×0.2 mm, 1.12 μm). The GC oven was heated from 45° C. to 280° C. at a rate of 3 K/min while the system was purged with helium carrier gas with a split ratio of 25. Separated compounds were recorded with the Agilent 5975C mass selective detector with ionisation energy of 70 eV and a scanning range of m/z 30-550 in the full scan mode.

EXAMPLES

Example 1

100 grams of PO was placed into a 500 cm$^3$ autoclave equipped with a magnetic stirrer. To this approximately 2-10% mass ratio of anti-solvent (for ex. distilled water) was added with stirring (~1000 rpm) at room temperature for the duration of 10-60 minutes. To the resultant product, 1-30% mass ratio of solvent (for ex. butyl acetate) was added and stirred vigorously (~1000 rpm) for the duration of 10-60 minutes. After leaving the mixture at ambient temperature, the liquid product consisted of two phases: a dark organic phase at the top and an aqueous phase at the bottom. These phase-separated products were centrifuged to obtain a clean separation of the organic and aqueous phases. The organic phase was subsequently distilled. Distillation yields a two-phase liquid product, a top light yellow organic phase (solvent) and a minor amount of colourless aqueous phase. The HAF will remain in the distillation flask. Similarly, the aqueous phase from an earlier phase separation process was put in a separatory funnel, and an equal amount of diethyl ether was slowly added, and the funnel was shaken vigorously for several minutes and then allowed to rest for approximately 30 min. The resultant solution separated into two distinct layers. The upper layer and bottom layer were designated as ether-soluble (ES) fraction and the ether-insoluble (EIS) fraction, respectively. Subsequently, from the ES fraction, ether was removed under reduced pressure with a rotary evaporator resulting in a low molecular weight phenolics. For the second liquid-liquid extraction, an equal quantity of dichloromethane was added to the EIS fraction, and the mixture was shaken for several minutes before being allowed to sit for approximately 30 min. The mixture gradually separated into two layers. The bottom layer was designated as the dichloromethane-soluble fraction of EIS (DCMS), and the upper layer was the dichloromethane-insoluble fraction of the EIS (DCMIS). The layers were separated, and the dichloromethane was removed under the vacuum with a rotary evaporator. Subsequent distillation of the DCMIS fraction yields a high amount of pyrolytic sugars and water as a by-product. Also, a subsequent distillation of both the ES fraction and DCMS fraction yields a high amount of low molecular weight phenolics and solvent as a by-product, and it will be further recycled to use for extraction purposes.

The typical product yields from this process are HAF (35-50% mass ratio), pyrolytic sugars (20-30% mass ratio), phenolics (8-12% mass ratio) and the remainder is the water content. These yields mostly depend on the type of biomass feed used to produce the PO and vary between feed to feed. Table 1 shows the comparison of properties of crude PO and HAF such as viscosity, HHV, Total acid number (TAN), water content and elemental analysis.

TABLE 1

Comparison of physical and chemical properties of crude PO, pyrolignin, HAF and HAF with phenolics

| Property | Pyrolysis oil | Pyrolignin | HAF | HAF with phenolics | Units |
|---|---|---|---|---|---|
| Total acid number | 111.85 | 73 | 88.15 | 103 | mgKOH/g |
| Water mass fraction | 23 | 3 | 1.60 | 2.7 | % |
| Density | 1.12 | na | 1.15 | na | g/cm$^3$ |
| C mass fraction | 41.68 | 55.95 | 62.61 | 60.42 | % |
| H mass fraction | 7.61 | 7.26 | 7.40 | 6.98 | % |
| O mass fraction (by difference) | 50.70 | 36.80 | 29.99 | 32.60 | % |
| Viscosity at 40° C. | 22.60 | na | 268 | na | mPa · s |
| High heating value, dry basis | 18.36 | 24.37 | 28.00 | 26.03 | MJ/kg |

Example 2

100 grams of PO was placed into a 500 cm$^3$ autoclave equipped with a magnetic stirrer. To this approximately 2-10% mass ratio of anti-solvent (for example distilled water) was added with stirring (~1000 rpm) at room temperature for the duration of 10-60 minutes. To the resultant product, 1-30% mass ratio of solvent (for example butyl acetate) was added and stirred vigorously (~1000 rpm) for 10-60 minutes. After leaving the mixture at ambient temperature, the liquid product consisted of two phases: a dark organic phase at the top and an aqueous phase at the bottom. These phases separated products were centrifuged to obtain a clean separation of the organic and aqueous phases. It has been found that a preferred range for the centrifugation step is at an applied force of 8000 g-12000 g.

The aqueous phase from the above phase separation process was put in a separatory funnel, and an equal amount of butyl acetate was slowly added, and the funnel was shaken vigorously for several minutes before being allowed to rest for approximately 30 min. The resultant solution separated into two distinct layers. The upper layer and bottom layer were designated as a butyl acetate-soluble (BS-1) fraction and the butyl acetate-insoluble (BIS-1) fraction, respectively. Subsequently, an equal quantity of butyl acetate was slowly added to the BS-1 fraction, and the funnel shaken vigorously for several minutes and then allowed to rest for approximately 30 min. The resultant solution separated into two distinct layers. The upper layer and bottom layer were designated as a butyl acetate-soluble (BS-2) fraction and the butyl acetate-insoluble (BIS-2) fraction, respectively. The fractions BS-1 and BS-2 were combined and added to the dark organic phase obtained from the first phase separation of PO. Finally, the resultant mixture (a dark organic phase+BS-1&2) was subjected to distillation under vacuum or atmospheric conditions to remove or evaporate the butyl acetate and water. The HAF remained in the distillation flask. Similarly, a subsequent distillation of the BIS-2 fraction yielded a high amount of pyrolytic sugars and water as a by-product.

The typical product yields from this process are HAF (35-50% mass ratio), pyrolytic sugars (20-30% mass ratio), with the remainder is being water content. These yields mostly depend on the type of biomass feed used to produce the PO and vary from feed to feed. Table 2 shows the comparison of properties of crude PO and HAF such as viscosity, HHV, Total acid number (TAN), water content and elemental analysis.

TABLE 2

Comparison of physical and chemical properties of crude PO, pyrolignin, and HAF with phenolics

| Property | Pyrolysis oil | Pyrolignin | HAF with phenolics | Units |
|---|---|---|---|---|
| Total acid number | 111.85 | 73 | 85 | mgKOH/g |
| Water mass fraction | 23 | 3 | 0 | % |
| Density | 1.12 | na | 1.18 | g/cm$^3$ |
| C mass fraction | 41.68 | 55.95 | 64.0 | % |
| H mass fraction | 7.61 | 7.26 | 6.80 | % |
| O mass fraction (by difference) | 50.70 | 36.80 | 29.20 | % |
| Viscosity at 40° C. | 22.60 | na | na | mPa · s |
| High heating value, dry basis | 18.36 | 24.37 | 27.4 | MJ/kg |

The invention claimed is:

1. A process for quantitatively fractionating pyrolysis oil (PO) comprising the steps of:
   a) adding water to single phase PO, the water being added in an amount of from about 1% to about 20% mass ratio of PO,
   b) following step a), adding a solvent with mixing, said solvent having less than about 10% mass fraction solubility in water and an affinity for hydrophobic aromatic fraction (HAF), and wherein said solvent is added in an amount of from about 1% to about 20% mass ratio of the PO,
   c) settling the mixture to allow phase separation into two fractions, thereby obtaining:
      (i) organic phase comprising the solvent, and HAF and,
      (ii) an aqueous phase comprising PO water soluble organics.

2. A process according to claim 1, wherein the solvent is added in an amount from about 5% to about 10% of the pyrolysis oil.

3. A process according to claim 1, wherein in step b) the solvent has a density of less than 1000 kg/m3 to obtain a density difference wherein the solvent phase/HAF is the top phase and the water soluble is the bottom phases.

4. A process according to claim 3, wherein the solvent forms an azeotrope with water when distilled.

5. A process according to claim 1, wherein the solvent is selected from $C_4$-$C_8$ monohydric alcohols, $C_2$-$C_8$ alcohol esters and diethyl ether or mixtures thereof.

6. A process according to claim 5, wherein the solvent is butyl acetate or a derivative of butyl acetate.

7. A process according to claim 3, wherein the solvent is added in an amount from about 5% to about 10% mass ratio of the pyrolysis oil.

8. A process according to claim 1, wherein the fractionation is carried out at a temperature in the range of from 15° C. to 75° C.

9. A process according to claim 8, wherein the fractionation is carried out at a temperature in the range of from 15° C. to 25° C.

10. A process according to claim 1, wherein in the hydrophobic aromatic fraction there is a volume reduction of greater than 50:1.

11. A process according to claim 1, wherein the fractionation is carried out in a continuous or batch reactor system.

12. A process according to claim 1, wherein the fractionation time under normal gravity ranges from 15 minutes to 2 hours.

13. A process according to claim 1, wherein fractionation is carried out using centrifugal separation.

14. A process according to claim 13, wherein the centrifugal force applied is from 8000 g to 12000 g.

15. A process according to claim 1, wherein the Hansen solubility parameter of the solvent are in the ranges, Dispersion 8-10 MPa^0.5, Polar 2-3 MPa^0.5 and Hydrogen Bonding 2-4.5 MPa^0.5.

16. A process according to claim 6, wherein the solvent is butyl acetate.

17. A process according to claim 6, wherein the solvent is n-Butyl acetate.

18. A process according to claim 6, wherein the solvent is isobutyl acetate.

19. A process according to claim 1, wherein the duration of step a) is from about 10 minutes to about 60 minutes; the duration of step b) is from about 10 minutes to about 60 minutes; or the duration of steps a) and b) are each from about 10 minutes to about 60 minutes.

* * * * *